US007257396B2

(12) United States Patent
Olsen et al.

(10) Patent No.: US 7,257,396 B2
(45) Date of Patent: Aug. 14, 2007

(54) TELEMATIC PROGRAMMING LOGIC CONTROL UNIT AND METHODS OF USE

(75) Inventors: John Olsen, Cumming, GA (US); David Bradley, Alpharetta, GA (US); Rhesa Jenkins, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 756 days.

(21) Appl. No.: 10/393,379

(22) Filed: Mar. 19, 2003

(65) Prior Publication Data

US 2004/0023645 A1 Feb. 5, 2004

Related U.S. Application Data

(60) Provisional application No. 60/366,711, filed on Mar. 21, 2002.

(51) Int. Cl.
*H04M 3/00* (2006.01)

(52) U.S. Cl. ....................................... 455/419; 455/420

(58) Field of Classification Search ................ 455/419, 455/420; 340/870.02; 701/35, 207
See application file for complete search history.

(56) References Cited

U.S. PATENT DOCUMENTS

| | | | |
|---|---|---|---|
| 5,014,206 | A | 5/1991 | Scribner et al. |
| 5,862,500 | A | 1/1999 | Goodwin |
| 5,867,382 | A | 2/1999 | McLaughlin |
| 5,919,239 | A | 7/1999 | Fraker et al. |
| 6,124,806 | A | 9/2000 | Cunningham et al. |
| 6,408,233 | B1 | 6/2002 | Solomon et al. |

FOREIGN PATENT DOCUMENTS

| | | |
|---|---|---|
| DE | 196 18 535 A1 | 7/1997 |
| GB | 2 225 459 A | 5/1990 |
| JP | H6-333117 | 12/1994 |
| JP | 2001-278414 | 10/2001 |
| WO | WO 96/31846 | 10/1996 |
| WO | WO 01/91438 A1 | 11/2001 |

*Primary Examiner*—Bing Q. Bui
(74) *Attorney, Agent, or Firm*—Alston & Bird LLP

(57) ABSTRACT

The present invention is directed to an apparatus, system and method for collecting, storing and time-stamping telematics data. A programmable logic control unit is described that is connected to one or more sensors mounted on a vehicle to capture, time-stamp and store telematics data. And, upon the happening of a triggering event, time-stamped telematics data is transferred from the control until to an external device via wireless or other communications methods.

31 Claims, 3 Drawing Sheets

TELEMATIC PROGRAMMING LOGIC CONTROL UNIT AND METHODS OF USE

CROSS REFERENCE TO RELATED APPLICATION

This application claims the benefit of priority from the U.S. provisional application No. 60/366,711 filed on Mar. 21, 2002 and entitled "Telematic Programming Logic Control Unit And Methods of Use" the entire contents of which is hereby incorporated by reference.

FIELD OF THE INVENTION

The present invention relates to an interface device that collects automotive sensor data and translates the data into a variety of wireless formats.

BACKGROUND OF THE INVENTION

The wireless communication revolution is taking the automobile industry by storm. Telematics—a broad term that refers to vehicle-based wireless communication systems and information services—is increasingly seen by the leaders of the U.S. automobile industry as the new cutting edge automotive innovation. Technologies that are being adapted for vehicles include Internet access, global positioning satellite (GPS) systems, vehicle tracking, mobile telephony, voice-activated controls, radar, and a wide range of entertainment systems from MP3 players to back-seat DVD movie theaters.

In general, the telematics systems that are known in the art are actually small computer systems that are installed in a vehicle. These systems have nearly all of the hardware found in a personal computer, including a processor, memory, display, keypad or touch screen and usually one or more interfaces to allow the telematic system to communicate with a GPS system or the electronic control module of the vehicle. Because the systems are essentially mobile personal computers, they also require an operating system and at least one software application to process and present the telematics data in a format that a user can use and understand.

Not surprisingly, there is a substantial expense associated with installing what is essentially a personal computer in a vehicle. While individuals and companies recognize the benefits associated with telematics technology, for many the cost of purchasing and installing a computer in a vehicle is prohibitively high. And this cost is multiplied for companies that own and operate multiple vehicles. A package delivery company, for example, faces an incredible initial investment if it intends to install telematics technology in a fleet of vehicles.

A need therefore exists in the industry for an improved system to collect and manage telematics data. Specifically, a need exists for an apparatus and system that provides the benefits of telematics systems that are known in the art at a reduced cost.

SUMMARY OF THE INVENTION

The present invention is directed to an apparatus, system and method for collecting, storing and time-stamping telematics data. A programmable logic control unit is described that is connected to one or more sensors mounted on a vehicle to capture, time-stamp and store telematics data. And, upon the happening of a triggering event, time-stamped telematics data is transferred from the control until to an external device via wireless or other communications methods.

In one embodiment of the present invention, a telematic data collection system is disclosed that includes a programmable logic control unit that includes an input interface; a processor; and a memory; wherein the input interface receives telematics data from a sensor; the processor time stamps the telematics data and stores the telematics data in the memory. In another embodiment, the programmable logic control unit includes an output interface and an external processing device that communicates with the programmable logic control unit and receives the time-stamped telematics data via the output interface.

In another embodiment of the present invention, a telematic data collection system is disclosed that includes a programmable logic control unit that includes an input interface; an output interface; a processor; and a memory; and an external processing device that communicates with the programmable logic control unit via a wireless radio; wherein the input interface receives telematics data from a sensor; the processor time stamps the telematics data and stores the telematics data in the memory; and wherein further the time-stamped telematics data is passed to the external device via the output interface of the control unit. In another embodiment, the external processing device communicates with the programmable logic controller through at least one of an infrared and an optical communications link.

In another embodiment of the present invention, a telematic data collection system is disclosed that includes a programmable logic control unit that includes an input interface; an output interface; a processor; and a memory; and an external processing device that communicates with the programmable logic control unit via a wireless radio; wherein the input interface receives telematics data from a sensor; the processor time stamps the telematics data and stores the telematics data in the memory; and wherein further the time-stamped telematics data is passed to the external device via the output interface of the control unit whenever the external device is within a predetermined distance of the control unit.

In another embodiment of the present invention, a telematic data collection system is disclosed that includes a programmable logic control unit that includes an input interface; an output interface; a processor; and a memory; and an external processing device that communicates with the programmable logic control unit via a wireless radio; wherein the input interface receives telematics data from a sensor; the processor time stamps the telematics data and stores the telematics data in the memory; and wherein further the time-stamped telematics data is passed to the external device via the output interface of the control unit in response to a manual trigger of the external device.

In another embodiment of the present invention, a telematic data collection system is disclosed that includes a programmable logic control unit that includes an input interface; an output interface; a processor that uses a ladder-logic programming language to manipulate and store the telematics data; and a memory; wherein the input interface receives telematics data from a sensor; the processor time stamps the telematics data and stores the telematics data in the memory.

In another embodiment of the present invention, a telematic data collection system is disclosed that includes a programmable logic control unit that includes an input interface; an output interface; a processor that uses a ladder-logic programming language that is configured to distinguish input signal characteristics and translate individual signal characteristics into a word that is useable in a wireless environment; and a memory; wherein the input interface receives telematics data from a sensor; the processor time stamps the telematics data and stores the telematics data in the memory.

In another embodiment of the present invention, a telematic data collection system is disclosed that includes a programmable logic control unit that includes an input interface; an output interface; a processor that uses a ladder-logic programming language that is configured to distinguish input signal characteristics and translate individual signal characteristics into a word that is useable in a wireless environment; and a memory; wherein the input interface receives telematics data from a sensor that is mounted on a vehicle; the processor time stamps the telematics data and stores the telematics data in the memory. In another embodiment, the sensor mounted on the vehicle is an electronic control module sensor.

In another embodiment of the present invention, a telematic data collection system is disclosed that includes a programmable logic control unit that includes an input interface; an output interface; a processor; and a memory; wherein the input interface receives telematics data from a sensor; the processor time stamps the telematics data and stores the telematics data in the memory; and an analog to digital converter that digitizes an analog input signal from the sensor.

In another embodiment of the present invention, a method of processing vehicle information is disclosed that includes the steps of capturing an analog signal from a sensor associated with the vehicle; converting the analog signal to a digital signal; inputting the digital signal to an input interface of a programmable logic control unit; assigning a time stamp to the digital signal; storing the digital signal and time stamp data in a memory of the programmable logic control unit; and transmitting the digital signal and time stamp data to an external device.

In another embodiment of the present invention, a method of processing vehicle information is disclosed that includes the steps of capturing telematics data as an analog signal from a sensor associated with the vehicle; converting the analog signal to a digital signal; inputting the digital signal to an input interface of a programmable logic control unit; assigning a time stamp to the digital signal; storing the digital signal and time stamp data in a memory of the programmable logic control unit; and transmitting the digital signal and time stamp data to an external device.

In another embodiment of the present invention, a method of processing vehicle information is disclosed that includes the steps of capturing an analog signal from an electronic control module; converting the analog signal to a digital signal; inputting the digital signal to an input interface of a programmable logic control unit; assigning a time stamp to the digital signal; storing the digital signal and time stamp data in a memory of the programmable logic control unit; and transmitting the digital signal and time stamp data to an external device.

In another embodiment of the present invention, a method of processing vehicle information is disclosed that includes the steps of capturing an analog signal from a sensor associated with the vehicle; converting the analog signal to a digital signal; inputting the digital signal to an input interface of a programmable logic control unit; assigning a time stamp to the digital signal; storing the digital signal and time stamp data in a memory of the programmable logic control unit; and transmitting the digital signal and time stamp data via wireless transmission to an external device.

In another embodiment of the present invention, a method of processing vehicle information is disclosed that includes the steps of capturing an analog signal from a sensor associated with the vehicle; converting the analog signal to a digital signal; inputting the digital signal to an input interface of a programmable logic control unit; assigning a time stamp to the digital signal; storing the digital signal and time stamp data in a memory of the programmable logic control unit; and transmitting via at least one of an infrared and an optical communications link the digital signal and time stamp data to an external device.

In another embodiment of the present invention, a method of processing vehicle information is disclosed that includes the steps of capturing an analog signal from a sensor associated with the vehicle; converting the analog signal to a digital signal; inputting the digital signal to an input interface of a programmable logic control unit; assigning a time stamp to the digital signal; storing the digital signal and time stamp data in a memory of the programmable logic control unit; and transmitting the digital signal and time stamp data via wireless transmission to an external device when the external device is within a predetermined distance of the programmable logic control unit.

In another embodiment of the present invention, a method of processing vehicle information is disclosed that includes the steps of capturing an analog signal from a sensor associated with the vehicle; converting the analog signal to a digital signal; inputting the digital signal to an input interface of a programmable logic control unit; assigning a time stamp to the digital signal; storing the digital signal and time stamp data in a memory of the programmable logic control unit; and transmitting the digital signal and time stamp data via wireless transmission to an external device in response to a triggering event, including, without limitation, the switching on or off of a vehicle ignition.

In another embodiment of the present invention, a method of collecting and storing signal data using a programmable logic controller is disclosed, the programmable logic controller including an input and output terminal, a processor and memory, and the method including the steps of receiving the signal data at the input terminal; translating the signal data to a desired output format; time-stamping the signal data; moving the translated and time-stamped data to the memory; and transmitting the translated data from memory to an external device in response to a triggering event.

In another embodiment of the present invention, a method of collecting and storing signal data using a programmable logic controller is disclosed, the programmable logic controller including an input and output terminal, a processor and memory, and the method including the steps of receiving the signal data at the input terminal; translating the signal data to a desired output format, including preparing the data for wireless transmission; time-stamping the signal data; moving the translated and time-stamped data to the memory; and transmitting the translated data from memory to an external device in response to a triggering event.

In another embodiment of the present invention, a method of collecting and storing signal data using a programmable logic controller is disclosed, the programmable logic controller including an input and output terminal, a processor and memory, and the method including the steps of receiving the signal data at the input terminal; associating an event type with the signal data; translating the signal data to a desired output format; time-stamping the signal data; moving the translated and time-stamped data, including the event type data, to the memory; and transmitting the translated data from memory to an external device in response to a triggering event.

BRIEF DESCRIPTION OF THE DRAWINGS

Figure 1:
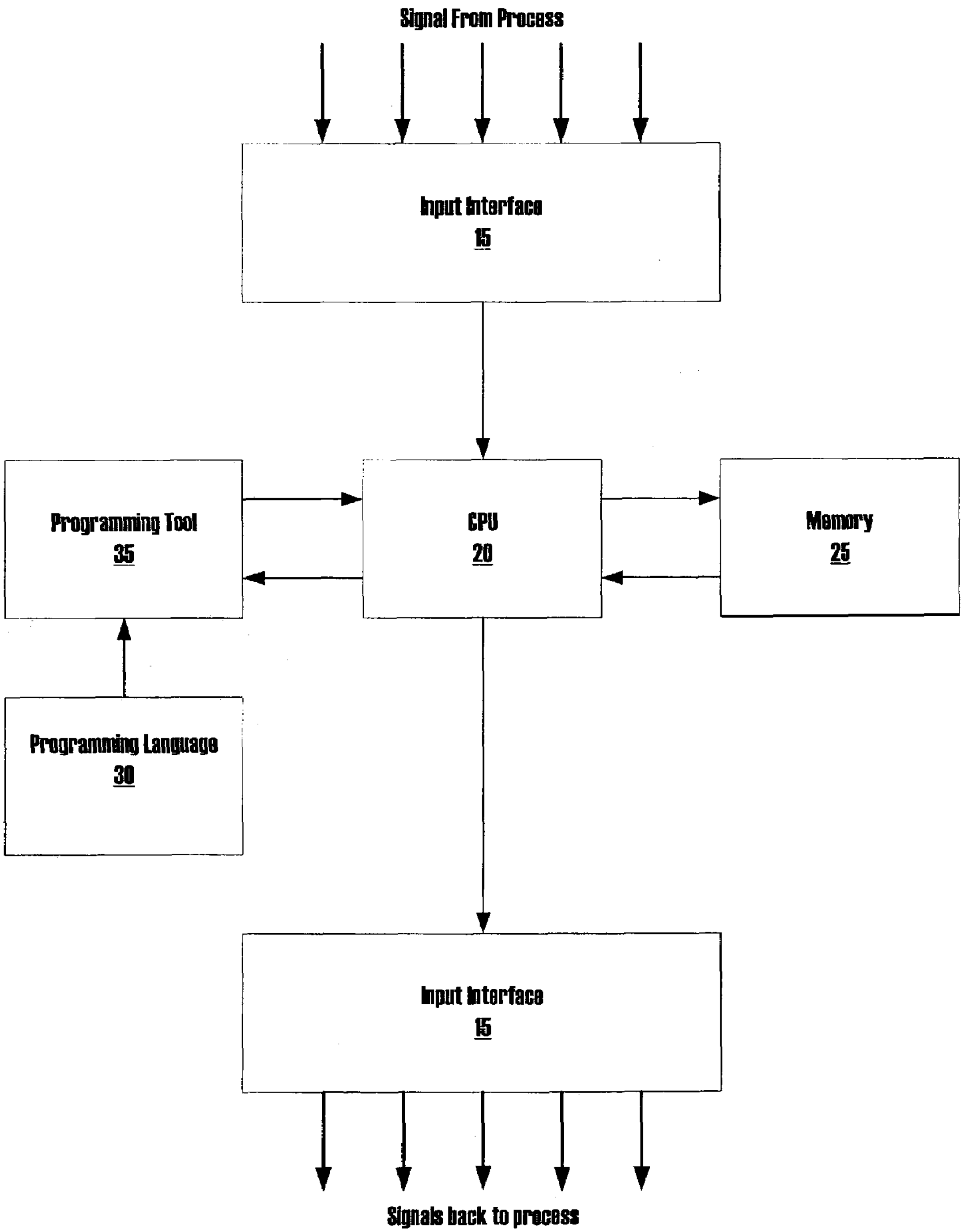

Having thus described the invention in general terms, reference will now be made to the accompanying drawings, which are not necessarily drawn to scale, and wherein:

FIG. 1 is a basic diagram of a programmable logic controller.

Figure 2:
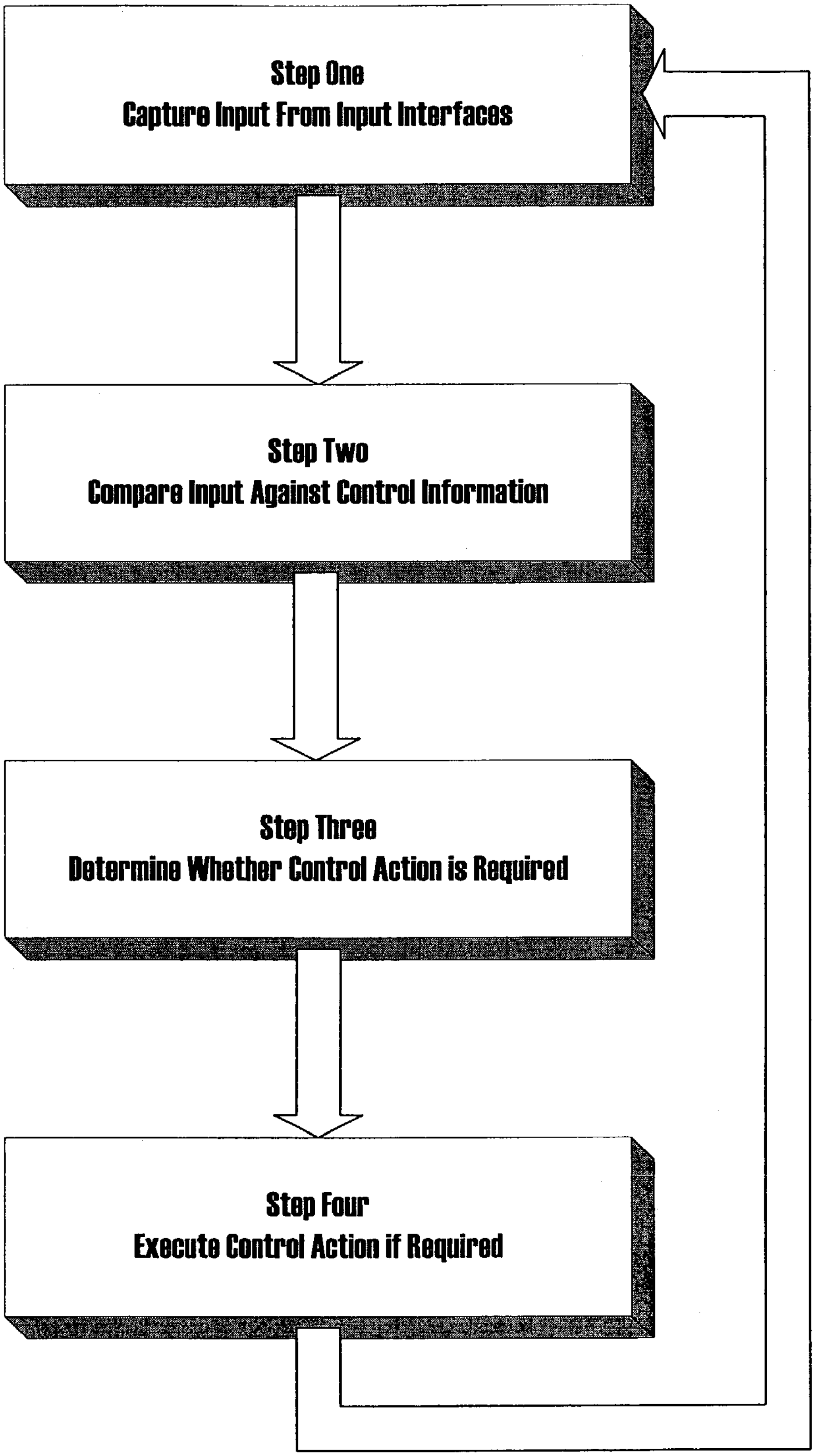

FIG. 2 is a process flow diagram of a programmable logic controller.

Figure 3:
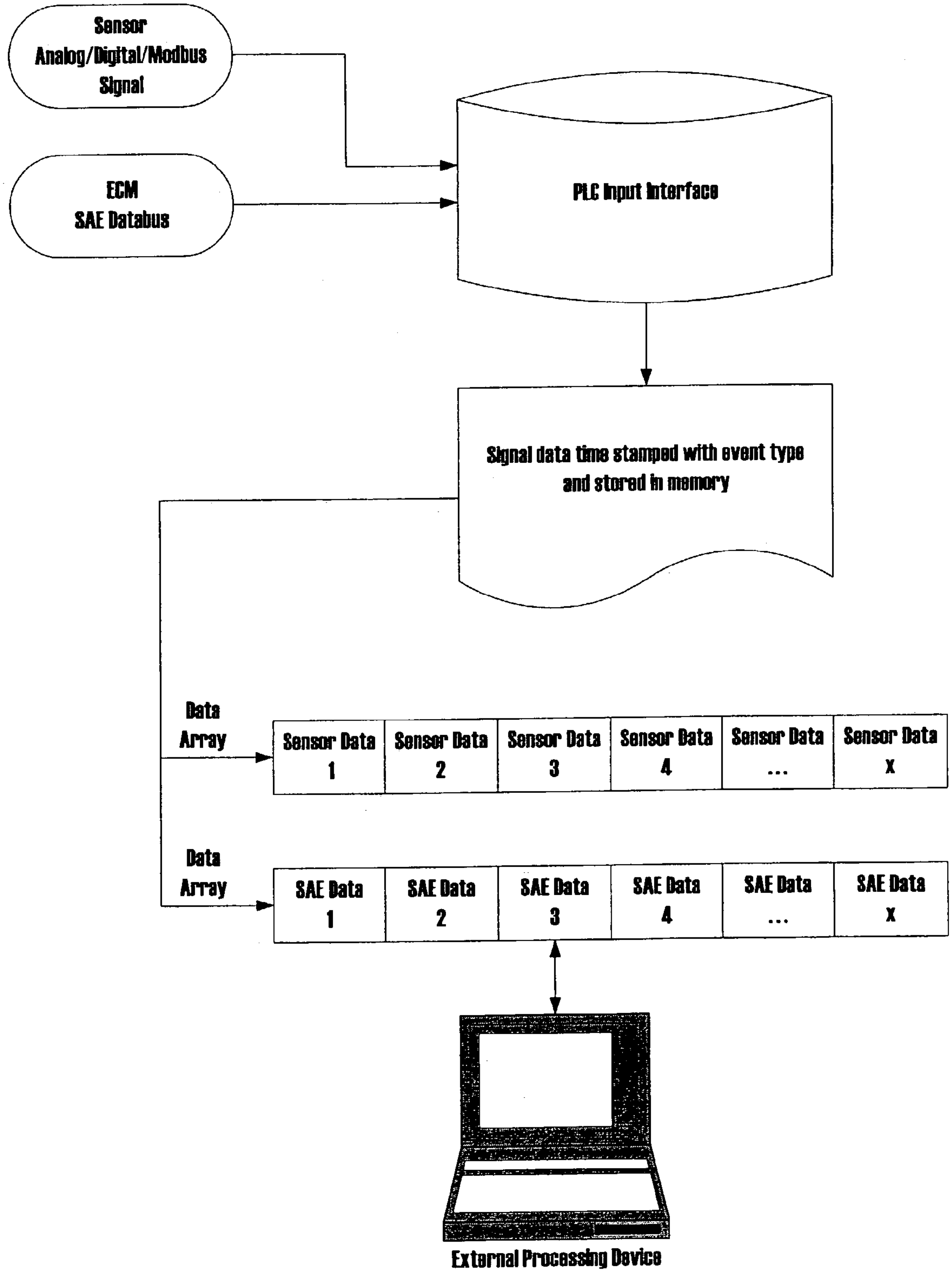

FIG. 3 is a process flow diagram that illustrates an operation of a telematic programmable logic control unit in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The following paragraphs describe systems and methods of using a novel telematic programmable logic control (PLC) unit 10.

The benefits of using PLCs to control and monitor systems and processes are well known in the art. PLCs provide control capabilities that were not possible with relay-based control systems. Control systems incorporating programmable controllers are now able to operate machines and processes with an efficiency and accuracy that were previously not achievable. Another known benefit of PLCs, is the modular and flexible architecture that allows hardware and software elements to expand as the application requirements change. If an application outgrows the limitations of a PLC, the unit can be easily replaced with a unit having greater memory and input/output capacity, and the old hardware can be reused for a smaller application.

PLC attributes make installation easy and cost effective. Their small size allows PLCs to be located conveniently, often in less than half the space required by an equivalent relay control panel.

PLCs, regardless of size, complexity, or cost, contain a basic set of parts. Some of the parts are hardware; others are software. FIG. 1 identifies the basic parts of a PLC. In addition, to a power supply system and housing that is appropriate for the physical and electrical environment, PLCs consist of the following parts: an input interface 15, processor 20, memory 25, programming language 30, programming tool 35, and an output interface 40.

The input interface 15 provides connection to the machine or process being controlled. The principle function of the interface 15 is to receive and convert field signals into a form that can be used by the processor 20. The processor 20 provides the main intelligence of the PLC. Fundamental operating information is stored in memory as a pattern of bits that is organized into working groups called words. Each word stored in memory is either an instruction or piece of data. The data may be reference data or a stored signal from the process that has been brought through the input interface.

The operation of a traditional PLC follows the fairly simple repetitive sequence illustrated in FIG. 2. In Step 1, the processor 20 looks at the process being controlled by examining the information from the input interface 15. In Step 2, the information is compared against control information supplied by and stored in the program. In Step 3, a determination is made whether a control action is required. In Step 4, the control action is executed by transmitting signals to the output interface 40, and upon execution of the control action, the process repeats. In this operation, the processor 20 continually refers to the program stored in memory for instructions concerning its next action and for reference data.

The output interface 40 takes signals from the processor 20 and translates them into forms that are appropriate to produce control actions by external devices. The program language 30 is a representation of the actions that are necessary to produce the desired output control signals for a given process condition. The program includes sections that deal with bringing the process data into the controller memory, sections that represent decision making, and sections that deal with converting the decision into physical output action. Programming languages 40 have many forms. A common programming language 40 used in PLCs matches the conventions of relay logic, which consisted of ladder diagrams that specified contact closure types and coils. This type of program language 40 consists of a representation of a relay logic controller scheme.

The programming tools 35 provide connection between the programmer and the PLC. The programmer devises the necessary control concepts and then translates them into particular program form required by the selected PLC. The tool 35 produces the pattern of electrical signals that corresponds to the symbols, letters or numbers in the versions of the program that is used by users.

The present invention employs a PLC in a novel way to accomplish much of the functionality of a telematics computer system at a fraction of the cost. As described above, the traditional use of a PLC is to control a process or a system based upon input from the process or system. In the present invention, the PLC does not control the process or system that is inputted to the PLC. Instead, the telematic PLC unit

10 of the present invention stores and time stamps the information received from the input interface 15.

In a preferred embodiment, the telematic PLC unit 10 provides the flexibility to have any type of input, in one case input from a vehicle sensor, and translate that input into an environment that can be wirelessly enabled. In one embodiment, an input is hardwired into the telematic PLC unit 10 and a ladder logic programming language 40 is configured to distinguish input signal characteristics and translate the individual signal characteristics into a word that is usable in a wireless environment.

In a preferred embodiment, the external input to the device comes from various sensors mounted on a vehicle, including a pump, bulk head door sensor, a rear door sensor, an ignition sensor and an electronic control module (ECM) sensor. The ECM is well known in the automobile industry and provides information about the operation of the vehicle such as temperature, oil pressure, engine on and off, road miles per hour and pedal position. In a preferred embodiment, the ECM signal is analog and is digitized via an analog to digital converter before being input into the telematic PLC unit 10.

In a preferred embodiment, the processor 20 is an Intel processor based on the 8086 chip. One of ordinary skill in the art will readily recognize that other central processing units can be used with the present invention. The 8086 chip and relatively slow, inexpensive memory modules are used in this embodiment because the operation of the telematic PLC unit 10 (as described below) does not require a great deal of processing power or speed. In operation, the unit 10 receives, time stamps and stores information from the various vehicle sensors. At predetermined instances, the information is translated into a wireless environment and transferred to an external wireless device 50. The external wireless device 50 thus assumes much of the responsibility for data processing and, as a result, the telematic PLC unit 10 can be manufactured and installed at a relatively low cost.

Because much of the data processing functionality is transferred to the external wireless device 50, the telematic PLC unit 10 does not require an operating system. Instead, the unit 10 relies on ladder logic programming that is well known in the art. The elimination of the operating system and reliance on ladder logic for the limited data processing performed by the telematic PLC unit 10 provides additional cost savings compared to the more complex telematic computer systems known in the art.

Another aspect of the PLC unit 10 of the present invention is the addition of firmware to the 8086 processor to enable store and forward functionality. Firmware is a well known category of memory chips that hold their content without power, and includes, without limitation, read only memory (ROM), programmable read only memory (PROM), erasable programmable read only memory (EROM) and electrically erasable programmable read only memory (EEPROM).

In a preferred embodiment, the store portion of the store and forward functionality is the process by which signals are retrieved on the PLC input terminals and signal characters are interpreted by ladder logic machine language. Ladder logic allows each terminal to be programmed to translate the character of the incoming signal into a desired output format and the translated data is moved to memory. In a preferred embodiment, the transport of data is achieved through known wireless protocols, such as 802.11 A or B. Using frequency hopping spread spectrum technology from 2.402 GHz to 2.480 GHz baud rates are selectable to any RS 232 protocol.

The ladder logic programming is used to assemble the output into chunks, or words of data, and to control the timing of collection, translation and keeping of each signal on each input terminal, and of each word of data stored in memory.

In contrast, the forward portion of the store and forward functionality is the process by which ladder logic is used to condition one of the PLC terminals to receive a signal (rs) that triggers transmission of the words of data stored in memory for output. Ladder logic programming fixes the timing of the output of each word of data stored in memory such that all data stored since the last transmission (ts) is sent in a stream until the memory is emptied.

In a preferred embodiment, the vehicle sensor data that is inputted into the telematic PLC unit 10 is translated into a wireless environment. Multiple wireless standards are known in the art that will be equally advantageous with the present invention. In a preferred embodiment, the telematic PLC unit 10 has two wireless devices connected to the output interface 40 of the unit. Having two wireless units allows the device to operate on two wireless standards and provides a backup system for external wireless devices 50 that are equipped with multiple wireless radios. In a preferred embodiment, the output interface 40 of the telematic PLC unit 10 is capable of wireless communications under the Bluetooth and 802 standards.

The Bluetooth and 802 standards are well known in the art. In general, Bluetooth is a class 3 wireless radio that works on a 2.4 GHz frequency. Bluetooth is a low power, low range data radio that provides the ability for short range data transfer between devices. Wireless devices that use the 802 standard work at higher frequencies and have the ability to transfer data over a greater range.

In another embodiment of the present invention, the communication between an external device and the PLC unit 10 occurs through an infrared communications port and/or an optical communications port. In this alternative embodiment, the external device can have wireless communication, but such capability is not essential. In still additional embodiments, other methods of transferring information from the PLC unit 10 to an external device are well known in the art and are equally advantageous with the present invention.

The following paragraphs describe the operation of a PLC unit 10 in accordance with an embodiment of the present invention. The following description is presented in the context of vehicle installation in which input signals are received from a plurality of vehicle-mounted sensors. However, the telematic 10 described above is platform independent and would be equally advantageous in other environments.

FIG. 3 is a high-level process flow diagram that illustrates the operation of a telematic PLC unit 10 in accordance with a first embodiment of the present invention. In this illustration, sensors are placed on a vehicle to capture information about the operation of the vehicle and are hardwired to the input interface 15 of a telematic PLC unit 10. In addition, a sensor is placed on the ECM unit of the vehicle and provides additional information about the vehicle such as temperature, oil pressure, engine status, miles per hour and pedal position. Some or all of the sensor signals may be analog and are digitized via an analog to digital converter before the signal is input to the telematic PLC unit 10.

Signal input is assembled into data chucks that are tagged with event types, time-stamped and stored in addressable memory. For ECM communication, event types are codes established by the Society of Automotive Engineers (SAE)

and include, for example SAE 1939, SAE 1587 and SAE 1708. Sensor and/or switch events may be based on an analog signal being captured in volts and millivolts. PLC ladder-logic then interprets and translates the data for flexible output into various formats. With reference to FIG. 3, an analog signal is translated to a digital signal and the digital signal converted to ASCII through the use of ladder logic and Modbus. Modbus is a well-known application later messaging protocol that is used to establish communication between devices on different types of buses or networks.

In a preferred embodiment, a data array allows for separation of individual signal inputs and unique translation of individual signals on each terminal. As an example, terminal 1 may be an analog to digital translation, terminal 2 may be a digital to ASCII translation, and so on. In this embodiment, output is ported using the standard I/O device protocols RS232 and 485. On of ordinary skill in the art will readily understand that other known protocols may be used including, without limitation, 422 and 486. Similarly, in alternative embodiments, output can be formatted as ASCII, binary, hexadecimal, decimal and ported to any of these standard protocols.

The data is then transferred to an external device 50 using at least one of the Bluetooth and 802.1 wireless standards. As explained above, other methods of transferring data from the telematic PLC unit 10 to an external device 50 are known in the art and will be equally advantageous with the present invention.

As can be seen from the foregoing, the present invention simplifies the task of real time acquisition and integration of auto telematics data by adding a PLC to vehicle electronics communications modules. The combination enables device independent translation and flexible communication of telematics data. In contrast, current state of the art requires proprietary software decoding and recomposition of data to achieve the same flexibility.

In a preferred embodiment, the external device 50 to which the telematic data is transferred is a wireless device equipped with an operating system such as Windows CE. In the context of a package delivery system, the external device 50 can be, for example, a handheld terminal or personal digital assistant (PDA) that a driver takes with him or her when the driver leaves the vehicle to deliver packages. When a driver removes the external device 50 from the vehicle, information may continue to be captured by the vehicle sensors and transmitted to the telematic PLC unit 10. This information may be automatically transferred to the external device 50 when the device gets within a predetermined distance from the telematic PLC unit 10. In such case, the external device 50 is programmed to send a signal to the telematic PLC unit 10 instructing the unit 10 to transfer all of the sensor information collected since the last transmission.

In alternative embodiments, the transfer of information from the telematic PLC unit 10 to the external device 50 does not occur automatically and instead is tied to a triggering event. For example, the communication between the telematic unit 10 and external device may occur only when the vehicle engine is running or, in still another embodiment, when the ignition is switched on or off. Other types of data transfer triggering events are possible and will be readily apparent to one of ordinary skill in the art.

In the context of a package delivery system, the value of the invention is that it provides a carrier with a clear picture of telematics information without requiring the installation of a personal computer system in each vehicle. Rather, the present invention provides a relatively inexpensive alternative that leverages the processing power that already exists in handheld computer systems carried by drivers. By adding the telematic PLC unit 10 to its vehicles, a carrier obtains vital telematics information about the driver interaction with and inside the vehicle. This increased visibility in turn facilitates better management and communication practices that improve package delivery services and driver performance. In addition, the functionality offered by the present invention enables automated work measurement in package operations that previously required another person ride alongside the driver taking copious notes of the driver activities during a delivery route.

The installation of a PLC unit 10 in the 12-volt environment of a delivery vehicle requires the use of an integrated power supply that allows a step up from 12 volts to the 24 volts required by the unit 10. In a preferred embodiment, the power supply is further configured to clean and store power to prevent integrity breaks resulting from magnified spikes in the 12-volt environment.

Another benefit of the present invention can be seen in the field of diagnostic and vehicle maintenance. In an embodiment of the present invention, a relatively low-cost telematic PLC unit 10 is installed in each of a fleet of vehicles. Each unit 10 is configured to capture vehicle diagnostic information that aids a mechanic in identifying which of the vehicles are in need of maintenance. Instead of requiring that each vehicle be equipped with sophisticated diagnostic equipment, a telematic PLC unit 10 is installed to capture and transmit the necessary diagnostic data. With such an embodiment, a mechanic simple walks down a line of vehicles with a handheld computing terminal that is configured to wirelessly capture the diagnostic information from the vehicles respective telematic PLC units 10. Thus, a mechanic is able to capture diagnostic data without entering or inspecting any of the individual vehicles.

Nor is the present invention limited to the capture of data related to vehicles. As indicated previously, the invention is platform independent. Thus, a sensor might be placed on a door inside an office building and a PLC unit 10 can be configured to store and time stamp data each time that the door is opened. In this example, the present invention will accurately record how many times the door was opened, when it was opened and for how long. In a related embodiment, a PLC unit 10 in accordance with the present invention could thus serve as an inexpensive alarm system.

Returning to the package delivery system example, a PLC unit 10 in accordance with the present invention may be configured to capture information from a carrier letter center box. Letter center boxes provide a means by which a carrier's customers can drop off letters and packages in a convenient location that will be picked up by a carrier driver. Letter center boxes are convenient for customers, but a carrier driver does not know whether a box has a package that needs to be picked up until the driver physically opens the box. In accordance with an embodiment of the present invention, a PLC unit 10 is configured to capture information from a sensor attached to a letter center box door. The PLC unit 10 captures and time stamps data whenever the letter center box is opened. This information is passed to a handheld terminal carried by a carrier driver when the driver approaches the letter center box. The handheld terminal is configured to process the data and indicate to the driver the number of packages that are in the letter sender box. Collection of the time-stamped events that occur at each letter center can also provide data to support demand analysis by location simplifying decisions on letter center placement and hours of operation.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A telematic data collection system comprising:

a programmable logic control unit disposed within a vehicle, said programmable logic control unit comprising:

an input interface;

a processor;

a memory; and an output interface coupled to a plurality of wireless communication devices, wherein said input interface receives telematics data from a sensor; said processor time stamps said telematics data and stores said telematics data in said memory; and said time-stamped telematics data is wirelessly transmitted from said memory to an external computing device via one or more of said plurality wireless communication devices coupled to said output interface.

2. The system of claim 1, wherein one of said plurality of wireless communication devices is a wireless radio.

3. The system of claim 1, wherein one of said plurality of wireless communication devices is an infrared communications link.

4. The system of claim 1, wherein said programmable logic control unit transmits said time-stamped telematics data automatically when said external computing device is within a predetermined distance of said programmable logic control unit.

5. The system of claim 1, said programmable logic control unit transmits said time-stamped telematics data in response to a manual trigger of said external computing device.

6. The system of claim 1, wherein said processor is an Intel processor based on an 8086 chip.

7. The system of claim 1, wherein said processor uses a ladder-logic programming language to manipulate and store said telematics data.

8. The system of claim 7, wherein said ladder-logic programming language is configured to distinguish input signal characteristics and translate individual signal characteristics into data that is useable in a wireless environment.

9. The system of claim 1, wherein said one or more sensors are mounted on a vehicle.

10. The system of claim 1, wherein at least one of said one or more sensors is an electronic control module sensor.

11. The system of claim 1, further including an analog to digital converter that digitizes an analog input signal from said one or more sensors.

12. The system of claim 1, wherein said programmable logic control unit further comprises an integrated power supply that allows a step up from 12 volts to 24 volts.

13. The system of claim 1, wherein said one or more wireless communication devices comprises an optical communications link.

14. The system of claim 1, wherein:

said plurality of wireless communication devices comprise a first wireless communication device that uses a first wireless standard and a second wireless communication device that uses a second wireless standard, said first wireless standard being different from said second wireless standard, and said programmable logic control unit is further adapted for translating said sensor signal data into output formats compatible with each of said wireless standards.

15. The system of claim 14 wherein said programmable logic control unit uses ladder logic programming to translate said sensor signal data into output formats compatible with each of said wireless standards.

16. The system of claim 14 wherein said programmable logic control unit is adapted to communicate with a first external computing device using said first wireless standard via said first wireless communication device and a second external computing device using said second wireless standard via said second wireless communication device.

17. The system of claim 1 wherein said external computing device comprises a hand-held computing device.

18. A method of processing vehicle information, said method comprising the steps of:

capturing an analog signal from a sensor disposed within a vehicle;

converting said analog signal to a digital signal;

inputting said digital signal to an input interface of a programmable logic control unit, said programmable logic control unit being disposed within said vehicle;

assigning a time stamp to said digital signal;

translating said digital signal and said time stamp into an output format useable by one of a plurality of wireless communication devices coupled to an output interface of said programmable logic control unit;

storing said translated digital signal and time stamp data in a memory of said programmable logic control unit; and transmitting said translated digital signal and time stamp data to an external computing device via said one of said plurality of wireless communication devices.

19. The method of claim 18, wherein said analog signal captured from said sensor comprises telematics data.

20. The method of claim 18, wherein capturing said analog signal from said sensor comprises capturing data from an electronic control module.

21. The method of claim 18, wherein said transmission of digital signal and time stamp data to said external computing device occurs via wireless radio.

22. The method of claim 18, wherein said transmission of digital signal and time stamp data to said external computing device occurs via an infrared communications link.

23. The method of claim 18, wherein said transmission of digital signal and time stamp data to said external computing device occurs automatically when said external computing device is within a predetermined distance of said programmable logic control unit.

24. The method of claim 18, wherein said transmission of digital signal and time stamp data occurs in response to a triggering event.

25. The method of claim 24, wherein said triggering event is the switching on or off of a vehicle ignition.

26. The method of claim 18, further comprising uploading said digital signal and time stamp data from said external computing device to a host system.

27. A method of collecting and storing signal data using a programmable logic controller, said programmable logic controller comprising at least one input terminal and at least one output terminal, a processor, and memory, said method comprising the steps of:

receiving said signal data from one or more vehicle sensors at said input terminal of said programmable logic controller, said programmable logic control unit being disposed within a vehicle;

translating said signal data to a desired output format useable by at least one of a plurality of wireless communication devices;

time-stamping said signal data;

moving said translated and time-stamped data to said memory; and transmitting said translated data from memory to an external computing device in response to a triggering event via said at least one of said plurality of wireless communication devices.

28. The method of claim 27, wherein the step of translating said signal comprises preparing said signal data for transmission via a wireless radio.

29. The method of claim 27, further comprising associating an event type with said signal data.

30. The method of claim 29, further comprising storing said event type in said memory.

31. The system of claim 27 wherein said triggering event is an indication that an ignition of said vehicle is turned on and that said vehicle is in motion.

* * * * *

UNITED STATES PATENT AND TRADEMARK OFFICE

CERTIFICATE OF CORRECTION

PATENT NO. : 7,257,396 B2
APPLICATION NO. : 10/393379
DATED : August 14, 2007
INVENTOR(S) : Olsen et al.

It is certified that error appears in the above-identified patent and that said Letters Patent is hereby corrected as shown below:

<u>Column 11,</u>

Line 27, after "plurality" insert --of--.

Signed and Sealed this

Thirteenth Day of November, 2007

JON W. DUDAS
*Director of the United States Patent and Trademark Office*